INVENTORS
GAIL CORNELIUS
IRVING C. ROEMER
BY Fryer & Tjensvold
ATTORNEYS

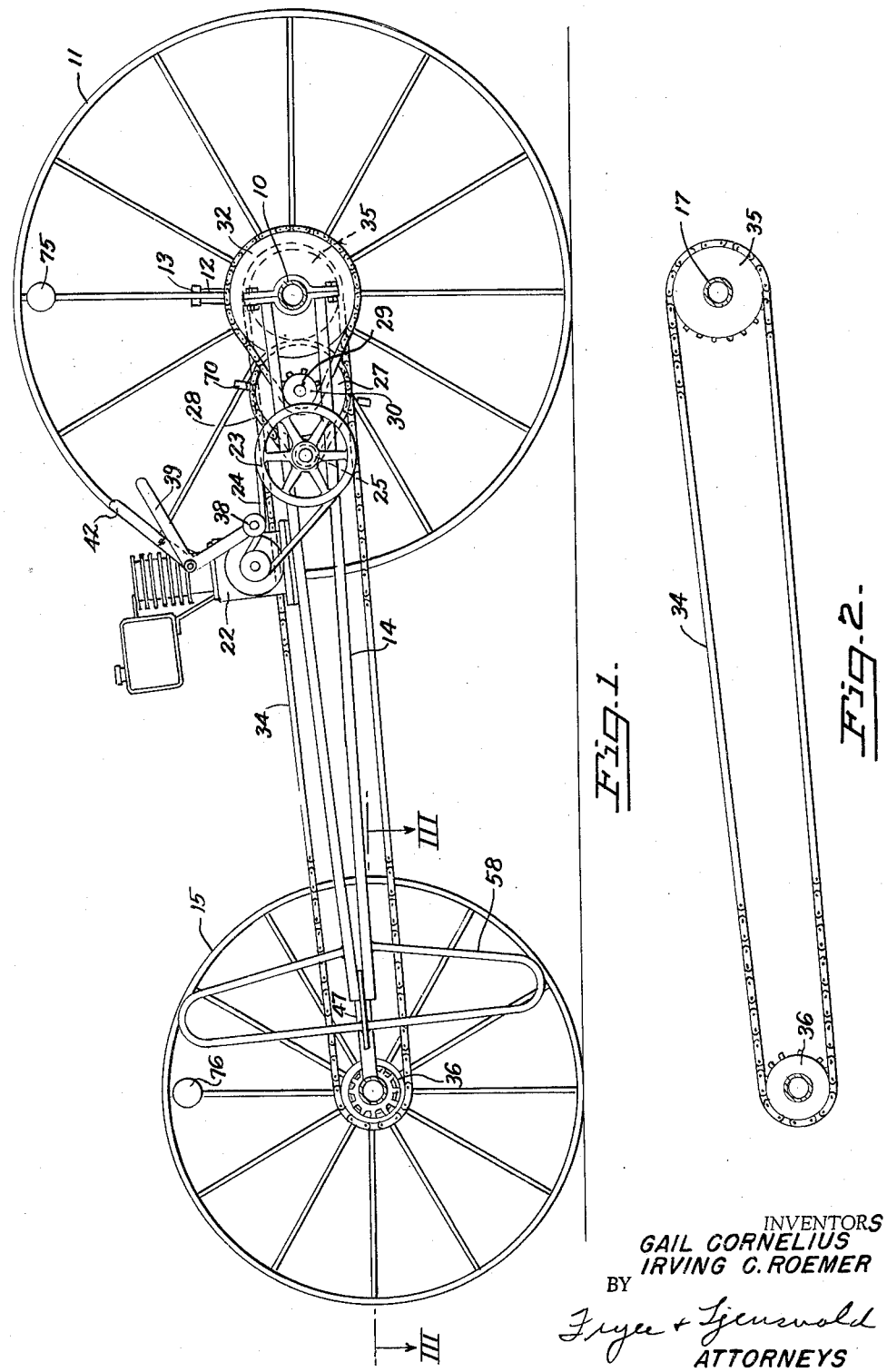

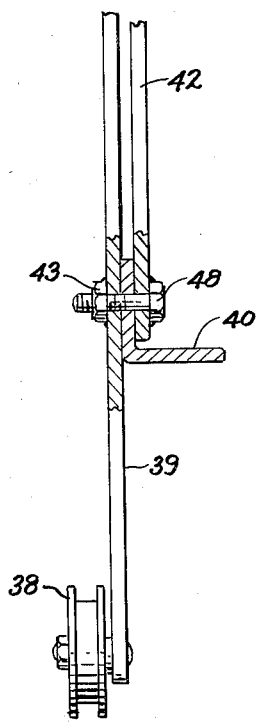
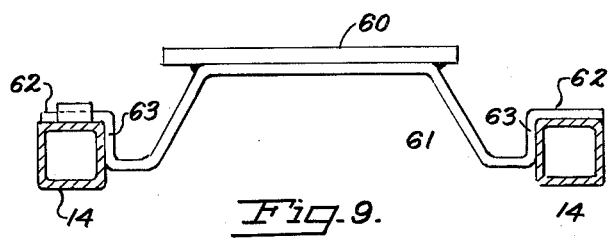
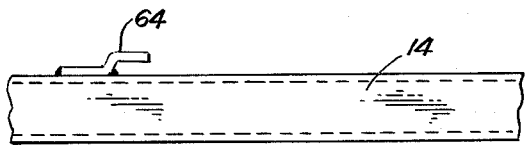
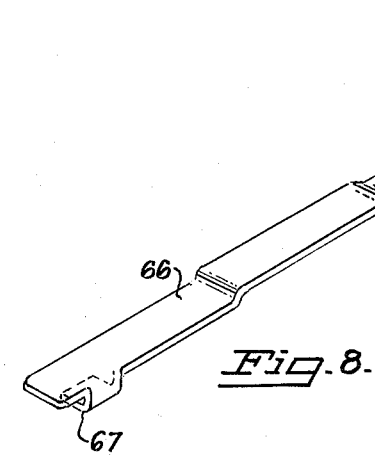
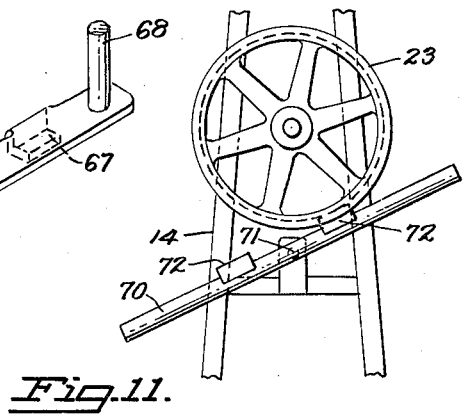
INVENTORS
GAIL CORNELIUS
IRVING C. ROEMER

United States Patent Office 3,211,382
Patented Oct. 12, 1965

3,211,382
POWER MEANS FOR MOVING IRRIGATION PIPE
Gail Cornelius, Portland, Oreg., and Irving C. Roemer, Lafayette, Calif., assignors to R. M. Wade & Co., Portland, Oreg., a corporation of Oregon
Filed Oct. 25, 1963, Ser. No. 318,924
4 Claims. (Cl. 239—212)

The present invention relates to the moving of wheel mounted sprinkler-type irrigation pipe and particularly to improvements in the kind of power driving mechanism for pipe disclosed in our assignee's patent to Cornelius, No. 2,582,416.

As set forth in said patent, it is common practice in sprinkler type irrigation equipment to provide a main or feed pipe along one boundary line of a field. This pipe is in communication with a pump and well or other source of water under pressure and has outlets spaced throughout its length. A movable lateral pipe extends from one of these outlets across the field at right angles to the feed pipe and carries spaced sprinklers. Consequently upon moving the lateral pipe from one outlet to the next throughout the length of the feed pipe, the entire field is supplied with moisture from the sprinklers. One well known way of moving the lateral pipe is to support it on wheels with the pipe extending through and secured to the hug of the wheels and to provide a trailing frame which supports an engine for imparting turning movement to the pipe and wheels. Such trailing frames which support the engine for driving the pipe and react the torque of the driving force with a trailing wheel have been made to extend from both sides of the pipe in order to enable reverse operation. Economically, however, it is desirable to use a trailing frame extending from only one side of the pipe but reversible in the manner taught by the above Cornelius patent to enable reverse operation. With the advent of larger irrigation equipment, including sprinkler laterals more than a quarter of a mile long supported on wheels nearly six feet in diameter, trailing frames have necessarily become so large that it becomes a great burden if not impossible for one man to swing the frame over the pipe in order to provide a reverse drive. Furthermore the trailing wheels are desirably larger wheels and preferably driven wheels to provide a maximum tractive effort. Since the outlets from the feed pipe are equally spaced, usually at intervals of sixty feet, and since the sprinkler risers on the lateral line must be aligned in a vertically upward position in use, and the wheels on the lateral are fixed against rotation with respect to the pipe, it is necessary that the circumference of these wheels be a sub-multiple of the distance between outlets on the feed pipe. For example with outlets at sixty foot intervals, the circumference of the wheels may be twenty feet. Consequently upon three revolutions of the wheels after operating from one outlet, the pipe is aligned with the next outlet and the sprinkler risers have concurrently assumed vertical positions. Since the operator is absorbed with the control of the engine and other details and since the crop on the ground or undulating terrain often obscure the feeder lines from view, considerable difficulty has been encountered in determining or remembering the number of rotations which have been made.

It is, therefore, the object of the present invention to provide an improved relatively heavy and durable trailing structure and engine mount for moving irrigation pipe with means to facilitate transfer of the trailing structure from one side of the pipe line to the other without undue physical effort and with means to provide positive indication at the trailing means itself of the distance which the pipe has traversed.

Further and more specific objects and advantages of the invention and the manner in which it is carried into practice are made apparent in the following specification by reference to the accompanying drawings.

In the drawings:

FIG. 1 is a view in side elevation of a trailing means and engine support for moving irrigation pipe embodying the present invention;

FIG. 2 is a fragmentary view of drive means interconnecting the main wheels and trailing wheels of the device shown in FIG. 1;

FIG. 7 is a fragmentary detail of clutch means shown in FIG. 1;

FIG. 8 is a perspective view of a removable crank employed for swinging the trailing frame over the pipe line;

FIGS. 9 and 10 are details of the engine support; and

FIG. 11 is a fragmentary view illustrating brake means for retarding the movement of the trailing frame as it gravitates toward the ground.

The movable or lateral pipe of an irrigation system of the kind described is shown at 10 in FIG. 1 of the drawings as supported by large wheels 11, there being a plurality of identical wheels secured against rotation to the pipe at spaced intervals throughout it length. Also spaced along the length of the pipe are sprinkler risers 12, each carrying a rotatable sprinkler head 13 which must be in the upstanding position illustrated during the sprinkling operation.

Figure 5:
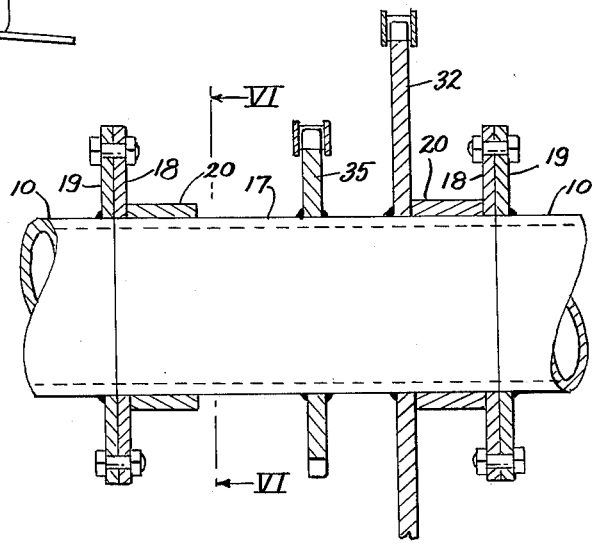
FIG. 5 is a fragmentary view in section illustrating the manner of connecting the trailing frame to the irrigation pipe.
Figure 6:
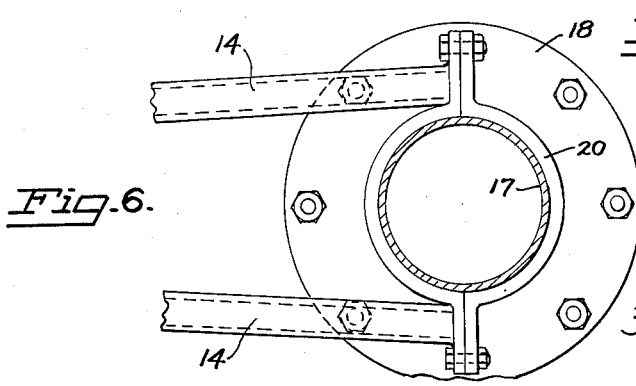
FIG. 6 is a sectional view taken on the line VI—VI of FIG. 5.

In order to move the pipe over the ground from one location to another, a frame made up of tubes 14 is pivotally connected with respect to the pipe 10 and extends rearwardly thereof where it is supported by a pair of trailing wheels, one of which is shown at 15 in FIG. 1. The manner of connecting the frame to the pipe 10 is shown in FIGS. 5 and 6 wherein two lengths of the pipe 10 are shown as spaced by a hollow journal 17 having end flanges 18 bolted to companion flanges 19 secured as by welding to the ends of the lengths of pipe 10. Bearings 20 made up of separable halves as shown in FIG. 5 embrace the hollow journal 17 and one-half of each bearing is secured to two of the frame members 14. Thus the pipe and its large supporting wheels fixed to it may roll over the surface of the earth with the frame in a trailing position supported at its rear end by the trailing wheels 15. The frame 14 is also free to be swung over the pipe in order to reverse the direction of drive.

Power for driving the pipe is provided by an engine 22 shown in FIG. 1 arranged to drive either one of two large pulleys 23 through a V-belt 24. The pulleys 23, only one of which is shown, are mounted on a common shaft 25 which extends in suitable bearings (not shown) through the frame so that there is one such pulley on each side of the frame for use in driving in the opposite direction when the frame is swung over the pipe and the engine has been removed and replaced on the top of the frame in its alternate position. The shaft 25 carries a small sprocket (not shown) driving a large sprocket 27 through a chain 28. The large sprocket is fixed to a shaft 29 which also carries a small sprocket 30. The small sprocket 30 drives a large sprocket 32 secured to the hollow journal as shown in FIG. 5 for imparting rotation thereto and therefore also to the pipe and wheels 11. To afford greater driving traction, the trailing wheels 15 are also driven by a chain shown at 34 in FIGS. 1 and 2 which is trained over a sprocket 35 (see also FIG. 5) fixed to the hollow journal and over a sprocket 36 arranged in driving relationship with the trailing wheels 15 by means presently to be described in greater detail. The same relationship in size is maintained between the sprockets 35 and 36 as between the wheels 11 and 15 to insure movement of the wheels over the ground at the same speed.

Clutch means for controlling the drive between the motor and the wheels is provided in the form of a belt tightening pulley 38 (see FIGS. 1 and 7) mounted on a pivoted angular lever 39 to enable the pulley to be brought against the back of the V-belt 24 between the motor and the pulley 23. The lever 39 is pivoted to a bracket 40 by means of a bolt 48. The bracket 40 may be secured to the engine by any suitable means. A locking lever 42 is also provided so that the lever 39 can easily be locked in its adjusted position. The head of the bolt 48 is welded to the locking lever 42 and a nut 43 on the bolt is welded to the lever 39. Consequently, upon downward movement of the locking lever, the bolt is threaded into the nut to urge the lever 39 into frictional contact with the bracket 40 and thus hold it in its position of adjustment. Since it is necessary to swing the frame 14 upwardly and over the pipe 10 to enable driving of the pipe in opposite directions and since the assembly described is far too heavy to be raised and lowered by one man, the reversal of position is accomplished by first removing the trailing wheels 15 and the engine 22 and then cranking the entire frame over the pipe 10 by rotation of the pulley 23 by means presently to be described in detail.

Figure 3:
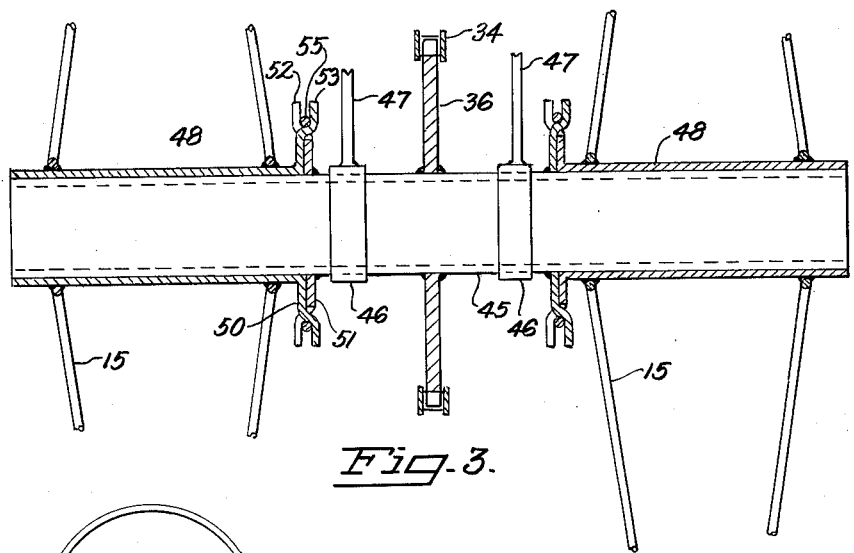
FIG. 3 is a fragmentary sectional view taken on the line III—III of FIG. 1.
Figure 4:
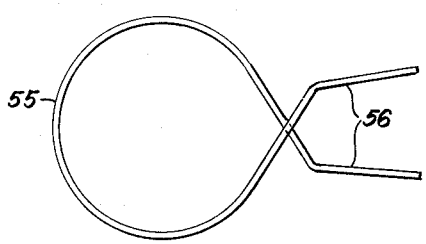
FIG. 4 is a view in elevation of a resilient ring employed for a quick release wheel connection as shown in FIG. 3.

The mounting of the trailing wheels 15 which enables their easy removal and also insures their positive drive through the chain 34 and sprocket 36 is best illustrated in FIG. 3. A rear driven shaft 45 is rotatably journaled in bearings 46 supported by rearward extensions 47 of the main frame 14. The sprocket 36 is welded to and drives the shaft 45 as previously described and the trailing wheels 15 are mounted on hubs 48 which slide over the opposite ends of the shaft. The hubs are secured against rotation on the shaft by companion flanges for each wheel, one shown at 50 secured to the wheel hub and the other at 51 secured to the shaft 45. These flanges have spaced lugs 52 and 53, respectively, which intermesh and extend beyond each other when the flanges are in abutment and are secured in place by a spring ring 55 (see also FIG. 4) disposed between the two sets of lugs. The ring 55 has crossed ends with extensions 56 which may be grasped and forced toward each other by hand to enlarge the ring and remove it from its locking position between the lugs on the flanges. This enables the wheels to be quickly removed from the shaft and the frame 14 will temporarily be supported by a double ended strut as shown at 58 in FIG. 1 which is designed for use with the frame on either side of the pipe line. The wheels 15 are preferably of aluminum and sufficiently light for them to be easily carried to the other side of the line and reassembled on the frame.

A base is provided for the engine 22 to hold it securely in place during operation and to permit its ready removal for transfer to the opposite side of the frame when the frame has been swung to its position for reverse drive. The basis illustrated in FIG. 9 where a plat 60, to which the engine may be suitably secured as by bolts or the like is shown as fixed to a support 61 having ends 62 resting upon two of the frame members 14. Adjacent the ends are downwardly extending portions 63 spaced to fit closely between the two frame members. One of the frame members is provided with a stop 64 as shown in FIG. 10 which overlies one of the ends 62 of the engine base to prevent its forward movement on the frame when tension is applied to the belt 24. A similar member 64 is positioned upon another of the frame members 14 for use when the frame is inverted.

In order to facilitate upward swinging movement of the frame when its position is to be reversed, advantage is taken of the power transmitting sprockets and chains between the large pulley 23 and the pipe line. For this purpose, a crank is provided as shown in FIG. 8. The crank comprises a lever 66 with hook-like members 67 bent from positions adjacent its opposite ends to embrace opposed spokes of the pulley 23 adjacent their outer ends. A crank handle 68 is provided adjacent the one end of this lever to be grasped manually for rotating the pulley, after the belt has been removed therefrom, in a direction opposite that employed for moving the pipe line forwardly. Thus the chain drive to the pipe serves, instead of advancing the pipe, to raise the frame to a vertical position above the pipe. Because of the simple hook-like members 67 embracing the spokes of the pulley, it is extremely easy to quickly remove the crank and apply a brake which limits the speed of the frame as it moves by gravity toward the ground on the opposite side of the pipe.

A brake for controlling the speed of the pipe is shown as having a lever 70 (see FIGS. 1 and 11) pivoted with respect to the frame as at 71 in a position to engage the periphery of the pulley 23. As shown in FIG. 11, where the frame 14 is illustrated in its vertical position, movement of the lever 70 about its pivot in either direction will engage one of two brake shoes 72, with the periphery of the pulley. The brake shoes may be short sections of durable V-type belting riveted or otherwise suitably secured to the brake lever to engage the V-groove in the pulley and provide a very effective braking action. Thus one man can, with very little effort, safely raise the entire frame from either side of the pipe and control its movement by gravity toward the ground on the opposite side of the pipe.

As previously stated, the outlets on the feed line which extend along one edge of the field to be irrigated are equally spaced at intervals such as sixty feet. Consequently with the main wheels 11 supporting the lateral line having a circumference of twenty feet, three revolutions of these wheels will not only align them with successive outlets, but will also insure that the sprinkler risers on the lateral line extends vertically upwardly for each outlet position. Since operators experience difficulty in counting the revolutions of the wheels 11, the present invention provided indicating means for this purpose. To accomplish this, the trailing wheels 15 are made with a circumference which is a sub-multiple of the distance to be traveled and greater than half the circumference of the main wheels. For example the large wheels have a circumference of twenty feet and the small wheels have a circumference of fifteen feet so that each size wheel is a sub-multiple of the sixty foot distance to be traversed. A visible reference point such as a distinguishing mark or indicator is placed on one spoke of one of the large wheels and one of the small wheels which may be the upwardly extending spoke when the sprinklers are in their vertical position, such indicators being shown at 75 and 76 in FIG. 1. Hence with all parts in the positions illustrated in FIG. 1 as the pipe is moved forwardly a distance of sixty feet, the first time the marked spokes are both at the top of the wheel as shown marks the stopping point or in effect indicates that the large wheel has rotated three times and the small wheel has rotated four times. Furthermore since the wheels are effectively geared to each other by a chain drive, correct registry of the indicators with each other is insured.

We claim:

1. In a drive means for an irrigation pipe supported on wheels comprising a frame having two ends, a driving engine supported on the frame, a pivotal connection between one end of the frame and the pipe enabling the frame to be swung to either side of the pipe, at least one trailing wheel at the opposite end of the frame, a reduced ratio driving connection between the engine and the pipe including a belt pulley on the frame rotatable with the engine removed to swing the frame upwardly about the pipe, the improvement comprising in combination brake means to retard movement of the frame toward the ground on the other side of the pipe.

2. Drive means for an irrigation pipe supported on wheels to move the pipe a fixed distance between spaced outlets in a main water line, and in which the pipe has sprinklers on risers operable in a vertical position comprising, an engine for rotating the pipe and wheels, a frame having two ends supporting the engine and pivotally connected at one of its ends to the pipe, a trailing wheel at the opposite end of the frame, the wheels on the pipe having a circumference which is a submultiple of the distance between said spaced outlets, and the trailing wheel having a circumference which is a smaller submultiple of the same distance, and a visible reference point on a wheel on the pipe and said trailing wheel said relative circumferences and reference points comprising a means whereby upon travel of both wheels said fixed distance between outlets the visible reference points on both wheels will be in the same position angularly with respect to the ground.

3. The combination of claim 2 in which the circumference of the trailing wheel is more than half that of the wheel on the pipe.

4. The combination of claim 2 with drive means connecting the wheel on the pipe and the trailing wheel for movement over the ground at the same speed.

References Cited by the Examiner

UNITED STATES PATENTS

| 2,582,416 | 1/52 | Cornelius | 239—212 |
| 2,665,169 | 1/54 | Tipton | 239—212 |
| 2,665,941 | 1/54 | Idler | 239—212 |
| 2,730,403 | 1/56 | Huntley | 239—212 |
| 2,892,466 | 6/59 | Stilwell et al. | 239—212 |
| 2,931,579 | 4/60 | Ruddell | 239—212 |

EVERETT W. KIRBY, *Primary Examiner.*